No. 870,998. PATENTED NOV. 12, 1907.
R. SCHAPLER & C. WASSER.
FIRE ESCAPE.
APPLICATION FILED DEC. 27, 1904.
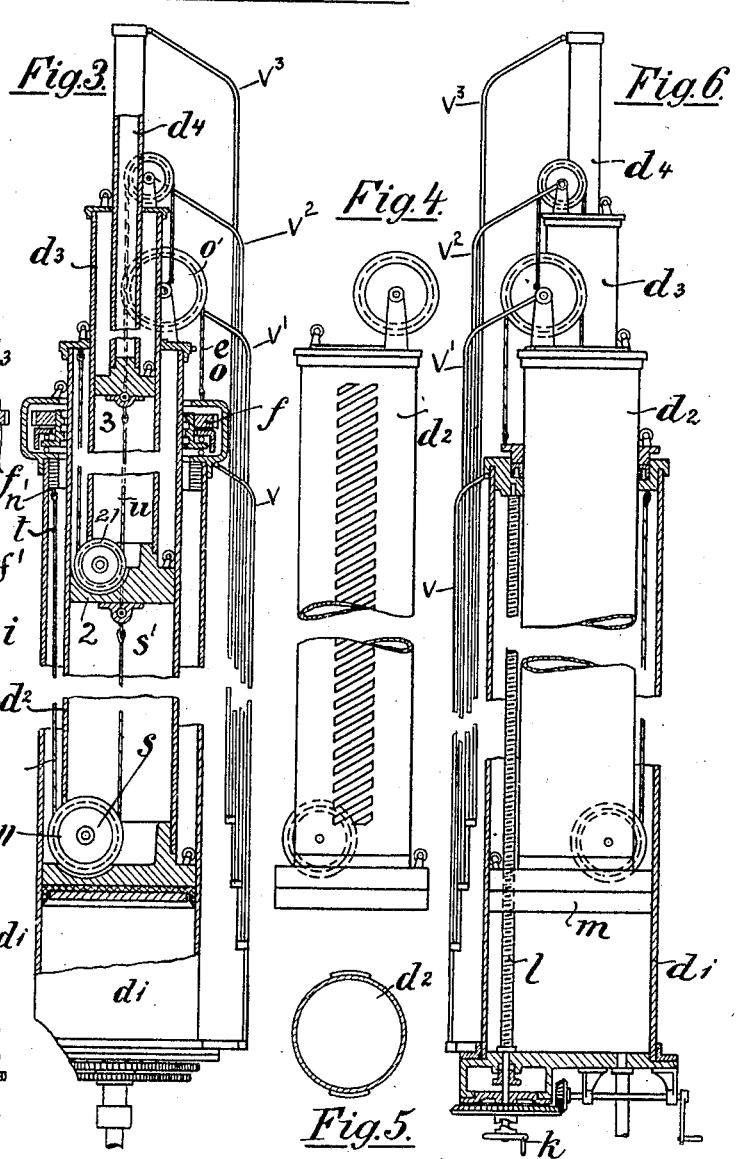

UNITED STATES PATENT OFFICE.

RICHARD SCHAPLER, OF FRANKFORT-ON-THE-MAIN, AND CARL WASSER, OF NÜREMBERG GERMANY.

FIRE-ESCAPE.

No. 870,998.  Specification of Letters Patent.  Patented Nov. 12, 1907.

Application filed December 27, 1904. Serial No. 238,320.

*To all whom it may concern:*

Be it known that we, RICHARD SCHAPLER, a subject of the German Emperor, residing at 11 Burgstrasse, Frankfort-on-the-Main, in the Empire of Germany, and CARL WASSER, a subject of the German Emperor, residing at 10 Rudolfstrasse, Nüremberg, in the Empire of Germany, have invented certain new and useful Improvements in and Relating to Fire-Escapes and the Like, of which the following is a specification.

This invention relates to telescopic fire-escapes.

The fire-escapes hitherto known have the disadvantage that considerable time is wasted in drawing out the single telescopic tubes of the escape one by one, and such escapes have, with others, the general disadvantage that a telescoping of the ladders is impossible except when the escape is nearly perpendicular, inasmuch as the telescoping is only effected under the weight of the several parts. These disadvantages are avoided according to the present invention, which is hereinafter described and illustrated in the accompanying drawings.

Figure 1 is a general view on a small scale of a fire-escape provided according to the invention. Figs. 2 and 3 show transverse longitudinal sectional views on an enlarged scale. Figs. 4 and 5 are detail views, and Fig. 6 illustrates in part longitudinal section a modified construction.

In carrying the invention into effect in its application to a fire-escape as illustrated in the accompanying drawings, a carriage $a$ is provided, upon which a support $b$ is mounted. The telescoping tubes $d'$ to $d^4$ are carried at $c$ upon the support $b$.

On fire-escapes in which telescopic tubes are used, the drawing out is effected by means of fluid under pressure provided in iron receptacles, which fluid under pressure, in the first instance, forces the inner tube outward, whereupon the other tubes follow in succession. On the other hand in the arrangement provided according to the present invention the pressure affects only one tube $d^2$ (Fig. 2). This tube is connected to the piston 1 which moves in the cylindrical tube $d'$, and it carries within it the tube $d^3$ which is connected to the piston 2. The tube $d^3$ carries within it the tube $d^4$ which is connected to the piston 3. The piston 1 carries within a recess suitably provided for it a pulley $s$ around which passes a chain cord, or other flexible member $t$ connecting the piston 2 with the top of the tube $d'$. Similarly the piston 2 is provided with a pulley 21 around which passes a chain cord or other flexible member $u$ which connects the piston 3 with the top of the tube $d^2$.

The piston 2 is connected to the top of the tube $d'$ by a chain cord or other flexible member $o\ e$ passing through a curved hole 22 formed in the piston 2 and passing over pulleys $o'\ e'$ mounted upon the top of the tube $d^2$, the two ends of the flexible member $o\ e$ being connected to the top of the tube $d'$. Similarly the piston 3 is connected to the top of the tube $d^2$ by means of a flexible member $h\ g$ passing through a curved hole 31 formed in the piston 3, and over pulleys $h'\ g'$ provided upon the top of the tube $d^3$. It will then be understood that when the piston 1 and the tube $d^2$ is forced upwardly upon the admission of fluid under pressure into the tube $d'$ by reason of the ends of the flexible member $o\ e$ which passes round the piston 2 being connected to the top of the tube $d'$, the piston 2 and the tube $d^3$ will also move upwardly, and similarly by reason of this upward movement of the tube $d^3$, the piston 3 and tube $d^4$ will also move upwardly until each tube is extended upwardly to the utmost limit of its length.

To the top of the casing $d'$ is attached the rope $t$ which, passing over the pulley S fastened to the piston 1, is secured to the bottom of the piston 2, consequently on the downward movement of the piston 1, the portion of the rope $t$ between the pulley S and the piston 2 becomes shortened and the section $d^3$ is drawn into the section $d^2$. In a like manner the tube $d^4$ is simultaneously drawn within the tube $d^3$ by a similar arrangement of the rope $u$ and pulley 21. The slidable section $v'\ v^2\ v^3$ are attached respectively to the sliding piston tubes $d^2\ d^3\ d^4$ and the bottom section $v$ to the fixed tube $d'$.

On its outer periphery the tube $d^2$ (Figs. 2 to 5) is provided with inclined teeth or threads of great pitch, and gears with a set of gear wheels $f$ which is operated by a downwardly directed spindle $i$, which is rotated by hand or motive power. According to the direction in which the spindle $i$ is rotated to the right or the left, the tube $d^2$ rises or lowers, and the same movement, which however is increased in extent, is imparted to the tubes $d^3$ and $d^4$. By the arrangement of the hand wheel $k$ upon the spindle $i$ it is possible to regulate the movement of the telescopic tubes either on rising or descending, even where these movements are not effected on the operation of the wheel $k$ itself.

In Fig. 6 a modified construction is illustrated, in which the screw threaded tube $d^2$ is dispensed with, and replaced by a special spindle $l$ carried within the casing, and which passes through the base $m$ of the first movable tube $d^2$, which latter is provided with a female screw thread, so that the operation will be substantially the same as in the first modification.

What we claim as our invention and desire to secure by Letters Patent is:—

1. In fire escapes or masts, a fixed supporting member, a sliding member, means for causing the movement of said sliding member, a second sliding member capable of movement with reference to the first sliding member flexible means for connecting the upper extremity of the fixed supporting member with the lower extremity of the second sliding member after first passing around the lower extremity of the first sliding member, and flexible means for the connection of the lower extremity of the second sliding member with the upper extremity of the fixed supporting member after first passing over the upper extremity of the first sliding member.

2. In fire escapes or masts, a fixed supporting tube, a sliding tube within said fixed tube, and a second sliding tube within said first sliding tube, a flexible member connecting the top of the fixed tube with the bottom of the second sliding tube after first passing around the bottom of the first sliding tube and a flexible member connecting the lower end of the second sliding tube with the top of the fixed tube after first passing over the top of the first sliding tube substantially as described.

3. In fire escapes or masts, a fixed supporting tube, a sliding tube within said fixed tube, and a second sliding tube within said first sliding tube, a flexible member connecting the top of the fixed tube with the bottom of the second sliding tube after first passing around the bottom of the first sliding tube and duplicate flexible members one passing on each side of the second sliding tube and connecting the lower end of the second sliding tube with the top of the fixed tube after first passing over the top of the first sliding tube substantially as described.

4. In fire escapes or masts members constituted of a number of parts capable of sliding within each other, flexible means for connecting the upper extremities of the one of said parts with the lower extremities of the adjacent part said flexible means passing around the lower extremity of an intermediate part, and flexible means for connecting the top of one part to the bottom of an adjacent part, said flexible means passing over the top of an intermediate part, mechanism for regulating the extension or contraction of said members substantially as described.

In testimony whereof we have signed our names to this specification in the presence of two subscribing witnesses.

RICHARD SCHAPLER.
CARL WASSER.

Witnesses to signature of Richard Schapler:
  GEORG WOERLER,
  WILHELM PLEINES.
Witnesses to signature of Carl Wasser:
  LUCAS MÜLLER,
  LEONHARD HAHN.